(12) United States Patent
Cohen (10) Patent No.: US 9,082,384 B1
(45) Date of Patent: Jul. 14, 2015

(54) MUSICAL INSTRUMENT WITH KEYBOARD AND STRUMMER

(71) Applicant: Lewis Neal Cohen, San Diego, CA (US)

(72) Inventor: Lewis Neal Cohen, San Diego, CA (US)

( * ) Notice: Subject to any disclaimer, the term of this patent is extended or adjusted under 35 U.S.C. 154(b) by 0 days.

(21) Appl. No.: 14/146,716

(22) Filed: Jan. 2, 2014

Related U.S. Application Data (60) Provisional application No. 61/751,861, filed on Jan. 12, 2013.

(51) Int. Cl.
G10H 1/18 (2006.01)
G10H 1/00 (2006.01)
G10H 1/34 (2006.01)

(52) U.S. Cl.
CPC .............. *G10H 1/18* (2013.01); *G10H 1/0091* (2013.01); *G10H 1/342* (2013.01)

(58) Field of Classification Search
USPC .................................................... 84/615, 653
IPC ........................................................ G10H 1/18
See application file for complete search history.

(56) References Cited

U.S. PATENT DOCUMENTS

| | | | | |
|---|---|---|---|---|
| 3,764,722 A | * | 10/1973 | Southard | 84/713 |
| RE28,999 E | * | 10/1976 | Southard | 84/713 |
| 4,658,690 A | * | 4/1987 | Aitken et al. | 84/629 |
| 4,794,838 A | * | 1/1989 | Corrigau, III | 84/600 |
| 4,924,746 A | | 5/1990 | Obata | |
| 5,085,119 A | * | 2/1992 | Cole | 84/724 |
| 5,602,356 A | * | 2/1997 | Mohrbacher | 84/609 |
| 5,726,372 A | * | 3/1998 | Eventoff et al. | 84/609 |
| 5,726,374 A | * | 3/1998 | Vandervoort | 84/638 |
| 5,773,742 A | * | 6/1998 | Eventoff et al. | 84/609 |
| 5,902,949 A | * | 5/1999 | Mohrbacher | 84/609 |
| 6,066,794 A | * | 5/2000 | Longo | 84/626 |
| 6,787,690 B1 | | 9/2004 | Celi | |
| 8,692,101 B2 | * | 4/2014 | Ryle et al. | 84/723 |
| 2004/0244566 A1 | * | 12/2004 | Steiger | 84/610 |
| 2011/0088535 A1 | | 4/2011 | Zarimis | |
| 2012/0160079 A1 | * | 6/2012 | Little et al. | 84/613 |

* cited by examiner

*Primary Examiner* — David Warren

(57) ABSTRACT

A musical instrument is comprised of a keyboard, a strummer, and a processor. The keyboard and strummer send event messages to the processor whenever a key is pressed, or a string is plucked, respectively. At the time a string is plucked, the processor dynamically assigns a note to the string, based on which keys are depressed. The dynamic note assignment ensures that the top, or a predefined string is part of any selected chord or scale passage. In response to strummer and keyboard events, the processor selects different timbres or articulations of the note including: clean, thumb harmonics, muted, hammer-on, or pull-off. The processor plays back recorded samples or synthesized tones to emulate the sounds of different playing techniques on an acoustic, electric, bass guitar or other stringed instruments.

8 Claims, 6 Drawing Sheets

MUSICAL INSTRUMENT WITH KEYBOARD AND STRUMMER

CROSS-REFERENCE TO RELATED APPLICATIONS

This application claims the benefit of provisional patent application Ser. No. 61/751,861 filed by the present inventor on Jan. 12, 2013.

FEDERALLY SPONSORED RESEARCH

Not Applicable

SEQUENCE LISTING OR PROGRAM

Not Applicable

BACKGROUND OF THE INVENTION

1. Field

This invention generally relates to music, specifically to an electronic musical instrument with a keyboard and a strummer, capable of reproducing common guitar playing techniques.

2. Background

A musician physically interacts with a musical instrument to select, actuate, articulate, and release musical tones or notes. On a piano, a musician simultaneously selects and actuates a note by striking a particular key. On a guitar, a musician first selects a note by holding a string down behind a fret, typically with the left hand. Some time later, he actuates the note by picking or plucking the string with the right hand. At the time of actuation, a guitar player can select between various timbres of the same note by moving the point at which the string is plucked closer to or further from the bridge, muting it with the heel of the hand, allowing part of the thumb to contact the plucked string (creating harmonics), or other techniques. After the note is actuated, he may articulate it through various techniques, including bending the string, or vibrating the left hand (vibrato). A guitar player may also use two fingers to transition between a first note and a second higher note on the same string by fretting the second note after the string has been plucked. This technique is called a hammer-on. If the second note is lower than the first, the player may pull off a left hand finger, effectively plucking the string a second time. This technique is called a pull-off. Each of the techniques described above creates a unique sound, allowing the musician to create an expressive performance. Although keyboard synthesizers can reproduce the sound of a guitar, it is difficult to reproduce, and alternate between typical guitar techniques on a keyboard synthesizer.

In addition to these techniques, the physical separation of the guitar strings imposes a timing relationship between strummed notes that is difficult to emulate from a keyboard alone, without the use of a strummer. It would be desirable for a keyboardist to have an instrument that uses a familiar keyboard plus a strummer to emulate typical guitar playing techniques.

It would be desirable for a musician to have a single electronic instrument that could emulate real timing, articulations, and sounds of multiple models of various stringed instruments, for example: acoustic, electric, and bass guitars, mandolins, and banjos. In addition to a strummer, such an instrument would require a keyboard, and will be referred to as a keyboard strummer instrument. The keys on the keyboard could be arranged in the manner of a: guitar fretboard, piano keyboard, two dimensional keyboard by the present inventor, or another keyboard. Each keyboard choice would have its own advantages and disadvantages. Prior attempts to create such an instrument have failed to yield an acceptable substitute for the original instruments. For example, MIDI guitars utilize a real guitar and rely on pitch detection to trigger notes in a synthesizer. The pitch detection step introduces a delay that some musicians find unpleasant. Guitarists are instructed not to mute notes or play thumb harmonics, to avoid confusing the pitch detection algorithm. Digital modeling guitars use signal processing to modify the output signal of a real guitar, to emulate another guitar or instrument. Many musicians prefer the fidelity of a wavetable synthesizer, which plays back recorded samples of the desired instrument. Both the MIDI guitar and digital modeling approaches require a real guitar, which adds cost, weight, and size.

Guitars and keyboards are large and bulky in comparison to many portable devices in use today. The area required by a guitarist to strum the strings is small in relation to the size of a guitar. A smaller, more portable instrument would be made possible by the availability of a small keyboard, plus a small strummer.

A downward strumming motion from the top to bottom string is the most natural motion to use when playing a guitar. The top string is the most easily accessed string for picking and strumming, due to the fact that it is easily visible, and not blocked by other strings above it. Practice is required to avoid plucking the top string when strumming a chord. On a conventional guitar, the top string may cause a dissonant note to sound, if it is not part of the desired chord. It is difficult for a musician to locate the other strings by touch alone. Furthermore, when playing a scale, lead, or melodic sequence of single notes, it is difficult for a novice guitarist to coordinate fingering notes on various strings with the left hand, while picking those particular strings with the right hand. The difficulties caused by needing to pick particular guitar strings, and avoid others, are a natural consequence of the static relationship between notes and strings, on a guitar fretboard. An instrument that simplifies picking, while reducing the likelihood of playing dissonant notes is needed.

BRIEF SUMMARY OF THE INVENTION

In one aspect, the present invention is a keyboard strummer instrument that allows the user to emulate typical guitar techniques on a keyboard that is not a guitar fretboard. In another aspect, the present invention provides a simplified strumming method for a keyboard strummer instrument that uses a guitar fretboard or other keyboard.

In one embodiment, in response to a keyboard and strummer event messages, a processor selects different timbres and articulations of a note including: clean, thumb harmonics, muted, hammer-on, or pull-off. The processor plays back recorded samples or synthesized tones to emulate the sounds of different playing techniques on an acoustic, electric, bass guitar or other stringed instrument. This enables a musician to create realistic guitar and stringed instrument performances on an electronic instrument.

In one embodiment, a keyboard strummer instrument is comprised of a keyboard, a strummer, and a processor. The keyboard and strummer send event indication messages to the processor whenever a key is pressed, or a string is plucked, respectively. At the time a string is plucked, the processor dynamically assigns a note to the string, based on which keys are depressed. One note assignment rule is to assign notes from lowest to highest pitch to strings from top to bottom, respectively. This rule ensures that the top string is part of any selected chord or scale passage, making it easier to strum and pick notes than on a guitar.

In another embodiment, a different note assignment rule is used to achieve another musical effect. For example, the top string is assigned the highest note, and the remaining strings are assigned the remaining notes, second from top string to bottom, lowest to second highest, respectively. This embodiment is useful for emulating ukulele or banjo sounds.

In another embodiment, a different note assignment rule is used such that one or more virtual open strings are defined. The notes selected by the keys are first assigned to strings. Remaining strings are then assigned open string notes.

In another embodiment, the note assignment rule enables one-finger chords, where the user selects the root of a chord, and the strings are assigned individual notes within the chord.

In another aspect, the present invention is a method of capturing or recording music performance data, including strumming, for use in MIDI sequencing, audio recording, music learning, or game playing.

DETAILED DESCRIPTION

Figure 4:
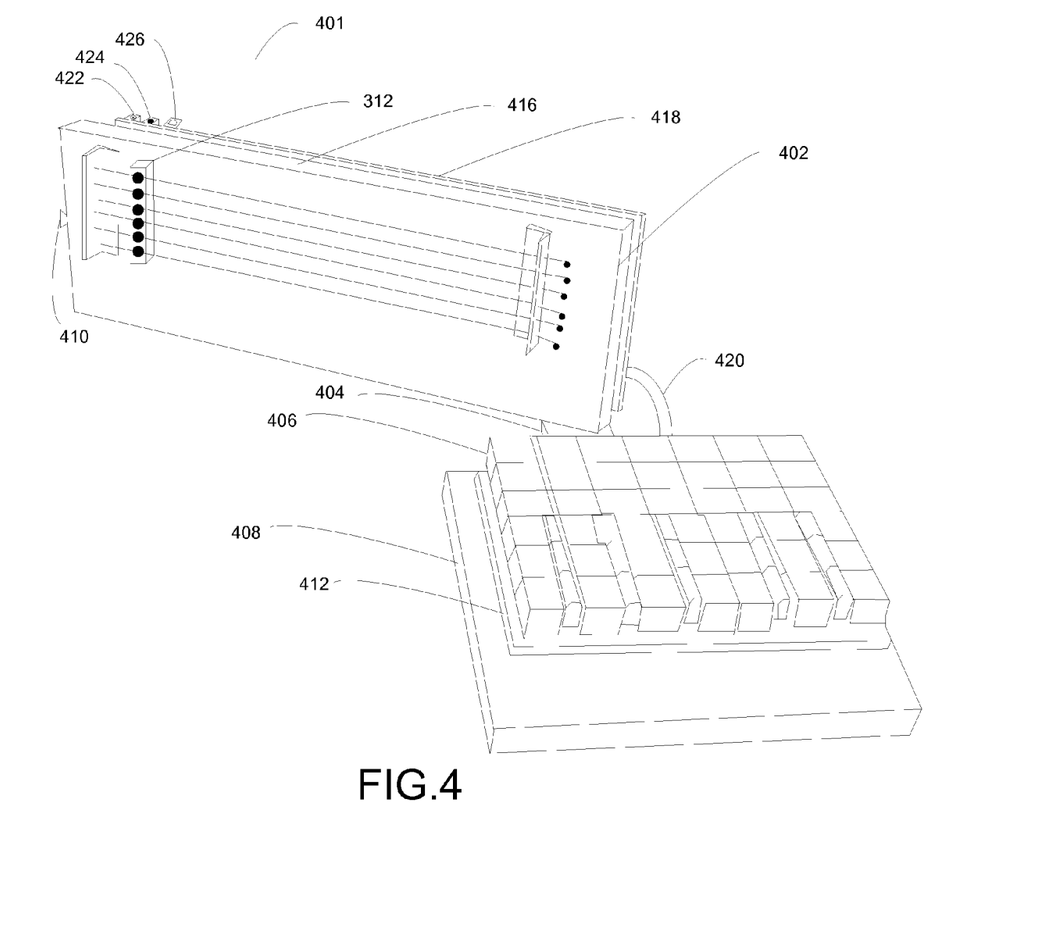
FIG. 4: Perspective view of one embodiment of the electronic instrument of the present invention, consisting of a left handboard attached to a strummer

FIG. 4 shows one embodiment of the present invention. Handboard 412 is a left handboard of the present inventor's two dimensional keyboard invention described in U.S. patent application #(SEE INFORMATION DISCLOSURE). Strummer 402 is disclosed in the present inventor's U.S. patent application #(SEE INFORMATION DISCLOSURE). The contents of both of these patent applications are incorporated herein by reference in their entirety. Handboard 412 is mounted to handboard base plate 408, which is approximately 7.5" wide by 6.5" deep. There are a plurality of keys 406 arranged in columns corresponding to letter name ("C", "C-Sharp","D","D-sharp", etc.) within an octave, and rows corresponding to octaves. The top playing surfaces of the keys are parallel to the floor, like typical piano keys. Rectangular tube 404 is attached to handboard base plate 408 on one end, and to strummer base plate 416 on the other. In a coordinate system where the top of handboard base plate 408 is the x-y plane, where the x axis is along a row of keys, where the y axis is along a column of keys, and the z axis is normal to the x-y plane, rectangular tube 404 forms an angle of about 22 degrees with the x axis in the x-y plane. This angle leads to a comfortable playing position, but other angles may also be used. The instrument is typically played on a strap attached to button 410, or on the musician's lap, with the x-y plane parallel to the floor. The plane of the strings will typically be perpendicular to the floor, but may be leaned back slightly to allow the musician to see the individual strings. This is accomplished by adjusting the angle between rectangular tube 404 and handboard base plate 408. The length of rectangular tube 404 is chosen based on the length of the musician's forearm. To accommodate different musicians, an alternate embodiment would have an adjustable or telescoping rectangular tube. Instrument PCB (printed circuit board) 418 is attached to the back (musician's body) side of strummer base plate 416. Strummer base plate 416 is 12" long by 6" high, making this embodiment smaller and more portable than a guitar. Other shapes of strummer base plate 416 are possible, including an acoustic or electric guitar body shape that has a cavity to accommodate instrument PCB 418. Handboard to instrument PCB cable 420 connects handboard 412 to instrument PCB 418. It could alternately be located inside rectangular tube 404. Instrument PCB power connector 422, headphone jack 424, and USB connector 426 are located on top of Instrument PCB 418, where they are easily accessible by a musician. The USB connection could be replaced by any wired, wireless, memory card, or other means of transferring firmware, software, games, songs, and sound samples to and from the electronic instrument.

Figure 2:
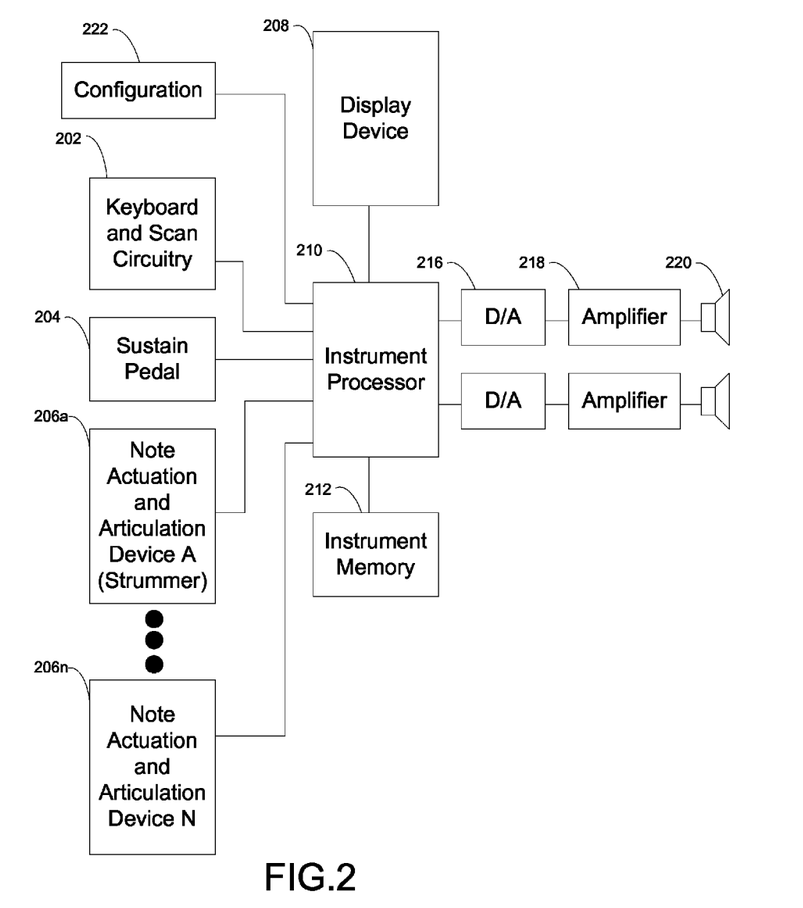
FIG. 2: Block diagram of one embodiment of the present electronic musical instrument invention

A block diagram of the present invention is shown in FIG. 2. A keyboard or handboard 202 having key scan circuitry is connected to a computer or instrument processor 210. A sustain pedal or hold pedal 204 and one or more note actuation or note articulation devices 206a-206n are connected to the processor. Each note actuation device 206a-206n may be referred to by a descriptive name related to the gesture on a conventional instrument it is intended to emulate such as: strummer, bowing input device, mouthpiece, or tremolo bar etc. In particular, strummer 206a connects to instrument processor 210. A display device 208 may optionally be connected to the processor. A memory or instrument memory 212 containing recorded samples of notes played on one or more instruments is connected to instrument processor 210. In particular, instrument memory 212 contains recordings or note samples of a guitar played with various techniques. In one embodiment, the sample set consists of every note on a particular guitar, played with three picking techniques: clean, muted by the heel of the hand, and with thumb harmonics. Each note's sample recording starts at the instant the note is plucked, and ends when the note has faded sufficiently. Note samples are recorded at two different playing volumes to add realism. For example, there are six samples recorded of the open top string of a guitar (note "E" 82.4 Hz): light picking clean, light picking heel mute, light picking thumb harmonic, heavy picking clean, heavy picking heel mute, and heavy picking thumb harmonic. In one embodiment, memory 212 contains sample sets for different stringed instrument models and types. For example a Fender Stratocaster, Gibson Les Paul sample set, and others could be included, to save the musician the cost of those guitars. More or fewer samples of a given note may be stored, based on the space available, and the desired emulation accuracy. Samples of each string played while muted by the left (or non-strumming) hand are also included, as this is a ubiquitous technique used when strumming. Memory 212 may also contain instructions or temporary data. A stereo pair or single D/A (digital to analog converter) 216 is connected to processor 210. Amplifier 218 is connected to the output of D/A 216, and connects to speakers or headphones 220. A configuration block 222 containing a USB interface, switches and memory is connected to processor 210.

Figure 1:
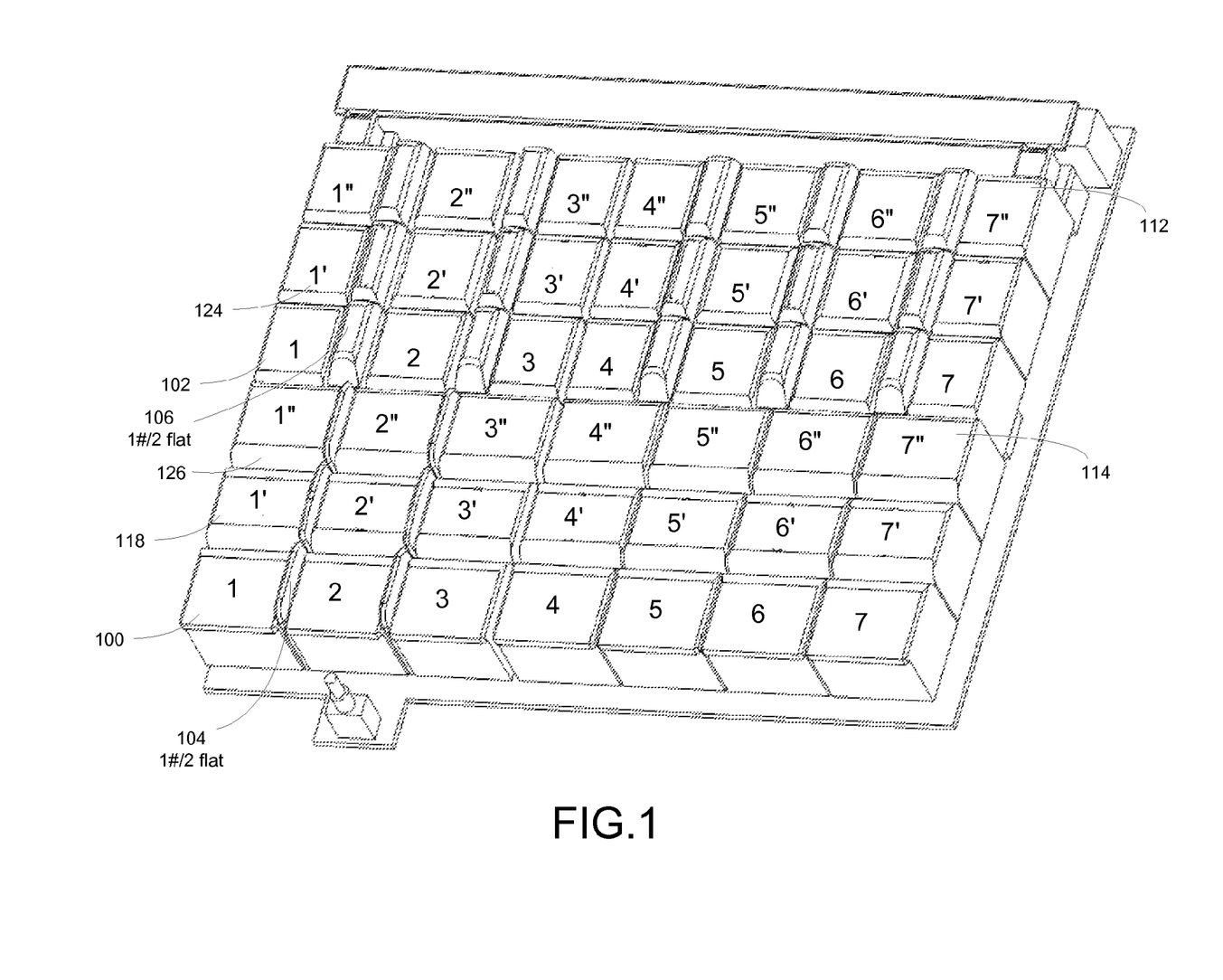
FIG. 1: Right Handboard of the present inventor's two dimensional keyboard, showing the scale degree of note assignments

FIG. 1 shows a right handboard of a two dimensional keyboard with each key labeled with the scale degree of its note in the major scale whose root is assigned to root key 100. Key 100 is marked "1" to indicate it is the root of the major scale. A single quote mark is used to indicate a note is one octave higher than the note in the same column of the first row. A double quote mark is used to indicate a note is two octaves higher than the note in the same column of the first row. Accordingly key 118 represents a pitch one octave higher than root key 100, and key 126 represents a pitch two octaves higher than root key 100. The white keys (for example keys 118 and 124), and some or all of the black keys (for example keys 106 and key 104) are duplicated in a front key area, bounded by keys 100 and 114, and a rear key area, bounded by keys 102 and 112. The duplication of keys allows the musician to play a note comfortably with either the thumb, or one of the other four fingers.

Figure 3:
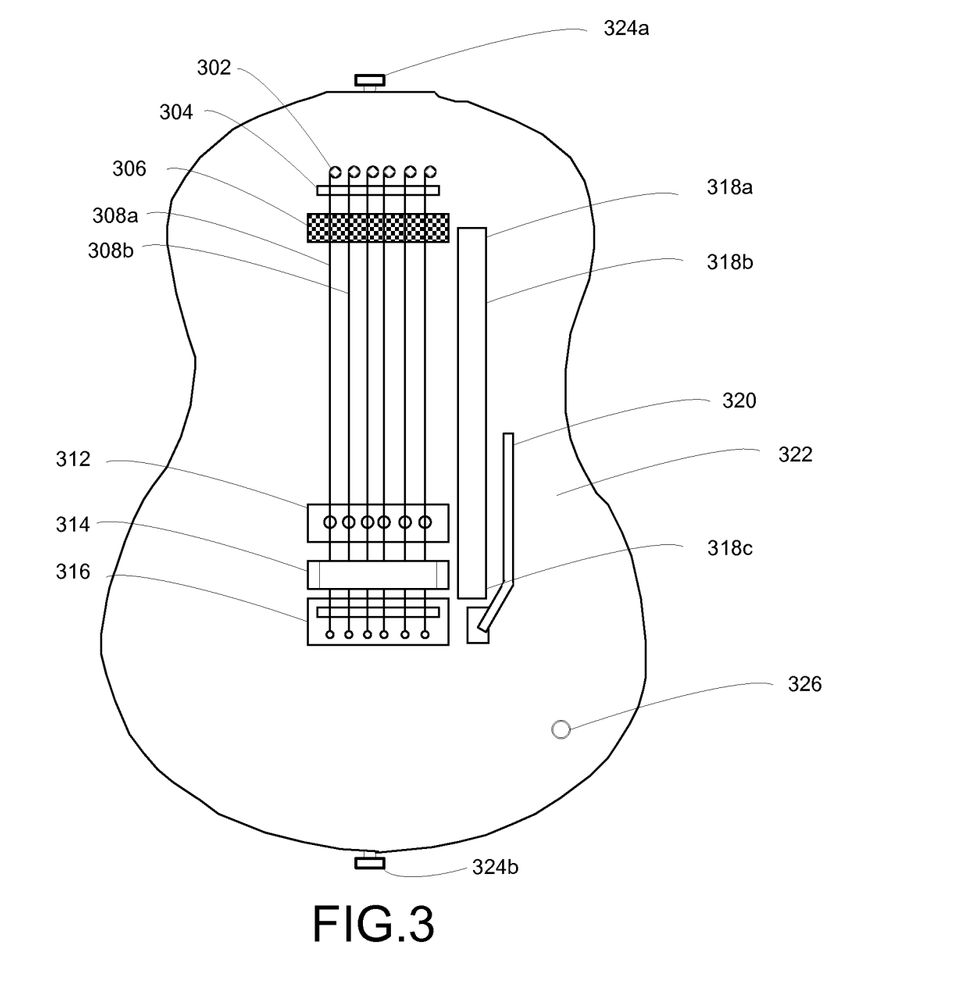
FIG. 3: Strummer Note Actuation and Articulation Device

FIG. 3 shows a strummer in the shape of an acoustic guitar body. A bridge 316 and a nut 304 are mounted to strummer base plate 322. A number of strings 308, typically six, are held under tension by tuning pegs 302. String 308a is referred to as the top string, as it will be the top and most easily accessible string, when the strummer is worn or held by a right handed musician. String damper 306 prevents accidental triggering, and ensures the vibrations caused by picking die within approximately 50 ms to allow retriggering. Polyphonic string transducer or pickup 312 converts the string vibrations to electrical signals. The pickup can be magnetic, hall effect, piezoelectric, piezoresistive or any pickup that generates a voltage proportional to the string vibration. A hand position sensor or ribbon strip articulation sensor 318 is positioned below the first string, at the distance where a guitarist naturally rests his ring finger or pinky, when using a flat pick. The ribbon strip articulation sensor 318 can be a linear potentiometer, capacitive touch device, optical device, resistive film, conductive traces, or any other device that can sense the position of a finger. Tremolo bar 320 is connected to a potentiometer, force sensing resistor, Hall Effect sensor, optical device, or other sensor. Strap buttons 324 allow the use of a guitar strap to wear the strummer as one would a conventional guitar. Output connector 326 allows the strummer output to connect to a synthesizer, or alternatively the strummer and synthesizer functions may be implemented as part of a single instrument. Optional hand heel mute articulation sensor 314 is located near bridge 316, where the heel of a hand can be rested comfortably while picking the strings.

Figure 5:
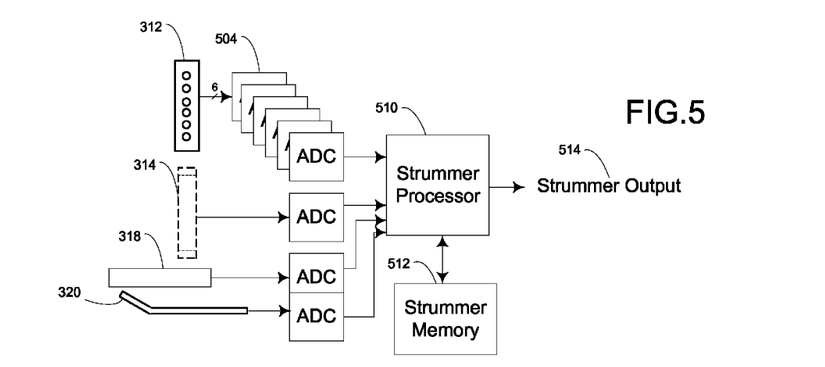
FIG. 5: Strummer Hardware Block Diagram

FIG. 5 shows a strummer hardware block diagram. A polyphonic string transducer or pickup 312 outputs a voltage proportional to each string's vibration. The pickup output for each string is connected to an analog to digital converter or ADC 504. An ADC with multiple inputs can be used in place of discrete ADCs. Ribbon strip articulation sensor 318 and tremolo bar articulation sensor 320 each connect to an ADC 504. The ADC outputs are connected to strummer processor 510. Strummer processor 510 can be a digital signal processor (DSP), microcontroller, Field Programmable Gate Array (FPGA), personal computer, or other integrated circuit (IC). Strummer processor 510 could also be combined with processor 210 if the strummer is part of a standalone instrument. Strummer memory 512 is connected to strummer processor 510.

Operation

Figure 6:
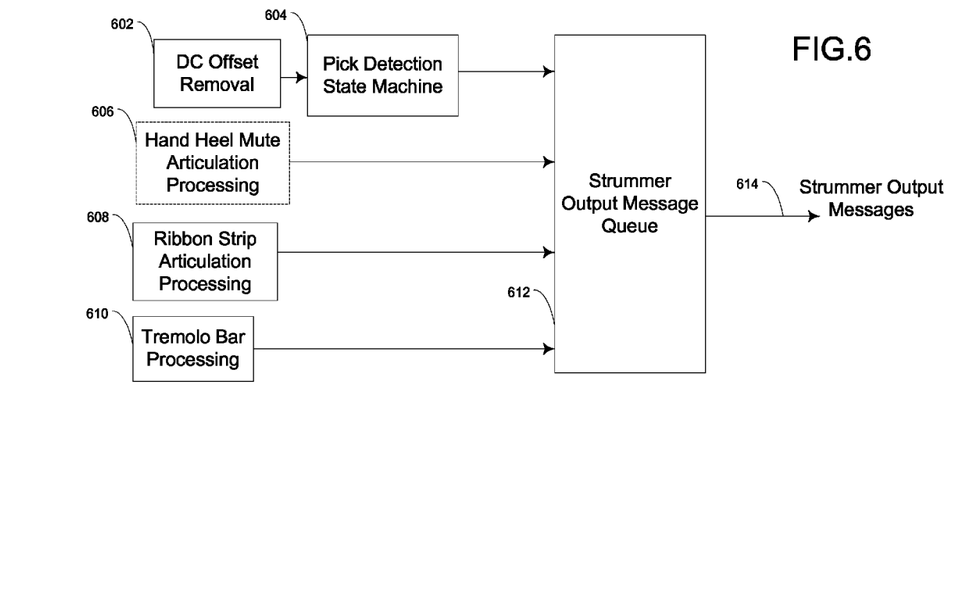
FIG. 6: Strummer Signal Processing Block Diagram
Figure 7:
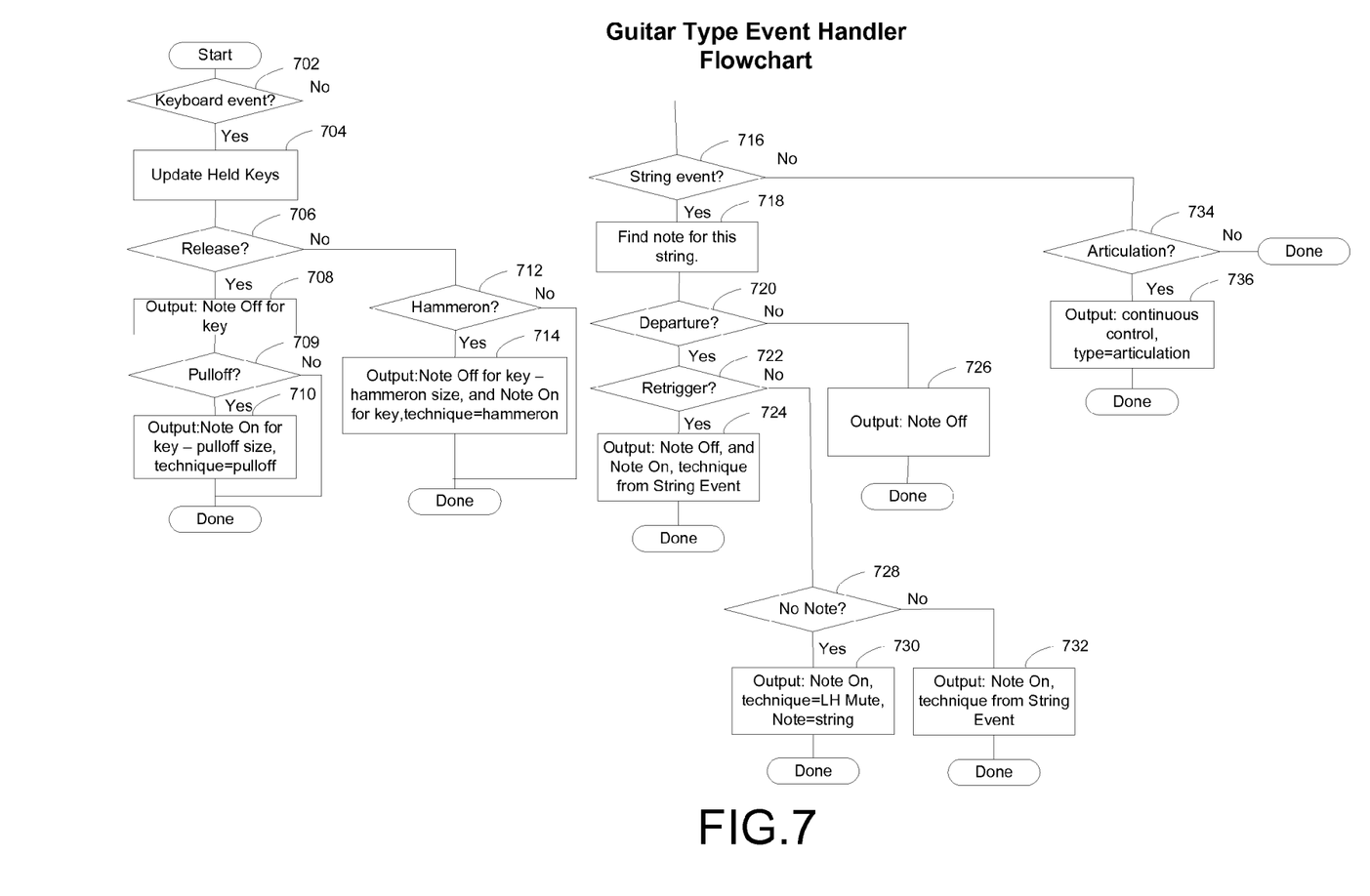
FIG. 7: Electronic Instrument Guitar Type Event Processing Flowchart

Strummer processor 510 implements the strummer signal processing block diagram shown in FIG. 6. The ADC samples are first converted to signed values if needed. The DC offset removal operation 602 is performed by subtracting the DC offset from each ADC sample, where the DC offset is found by accumulating the ADC samples for a string over a period of 1 second, and dividing by the number of samples. The pick detection state machine 604 processes the DC offset corrected ADC samples to detect whether a string has been picked, its volume, and what type of technique was used during picking. It then enqueues a message containing this information in strummer output message queue 612. The Ribbon strip articulation processing 608 is performed to determine if any articulation gestures are being input on ribbon strip articulation sensor 318. For example, the player can indicate a picking position relative to the bridge 316 by touching ribbon strip articulation sensor 318 at a certain position. Tremolo bar processing 610 can also lead to a tremolo bar articulation strummer message 614 being enqueued. Optional hand heel mute articulation sensor 314 is processed 606, and used for correctly inferring the hand heel mute technique, or for silencing a string. The strummer output message queue module dequeues the strummer output event indications or strummer messages 614 and transmits them serially or in parallel to an instrument processor 210. Any data formatting or protocol may be used to transmit the strummer messages: for example MIDI, USB, or a proprietary format. Instrument processor 210 implements a guitar type event handler as shown in FIG. 7. The event handler processes keyboard and strummer event indications, and uses them to control notes in a synthesizer. The synthesizer may be internal or external to the keyboard strummer instrument. FIG. 2 shows the case where instrument processor 210 implements the synthesizer as well as the guitar event handler.

The ribbon strip articulation device 318 can be used to establish picking position, meaning the distance from the bridge, which can then be used by a synthesizer to select the appropriate guitar samples. If the player touches the ribbon strip 318c close to the bridge 316, the synthesizer can play back recordings of an acoustic guitar picked near the bridge, with more treble. If the player touches the ribbon strip 318a close to the nut 304, the synthesizer can play back recordings of an acoustic guitar picked near the sound hole, with more bass. In one embodiment a linear potentiometer is used. The voltage output is proportional to finger position. ADC 504 converts the voltage to a digital code. Strummer processor 510 converts the digital code to a position reading. The position reading is quantized to the number of supported picking positions. The ribbon strip articulation device can be used to select pickups to be emulated in addition to picking distance from the bridge. The ribbon strip articulation device can be segmented such that a segment between 318b and 318c is interpreted as picking position, and another segment for example between 318a and 318b, is interpreted as a controller for pitch bend or slide. Strummer processor 510 may be programmed to interpret the different values, and translate them to particular note articulation strummer messages 614, such as picking position selection, pitch bend, slide or others. Or processor 510 may send a raw ribbon strip articulation strummer message 614 with the measured ADC value, and leave interpretation to the synthesizer receiving the message.

The tremolo bar articulation device 320 can be used to modify the pitch of notes in a synthesizer in to emulate the tremolo bar effect on a conventional electric guitar. In one embodiment, a rotary potentiometer is coupled to the tremolo arm. The voltage output is proportional to the angle of the tremolo bar with respect to the strummer base plate 322. ADC 504 converts the voltage to a digital code. Processor 510 converts the digital code to an angle reading. The angle reading is scaled to give the desired pitch bend range. By programming a different range, or mapping characteristic between angle and pitch bend, effects that are not possible on a conventional guitar will be possible. It would be possible for the tremolo bar to be used to control other effects/parameters of the performance, such as volume, wah etc. Strummer processor 510 may send tremolo bar strummer messages 614 indicating pitch bend amount, angle, or the raw ADC value, and leave interpretation to the synthesizer receiving the message.

Referring to FIG. 2, configuration block 222 sets the current sound mapping, sample set, and mode of the instrument to a default or previously stored value. A user could select a particular manufacturer and model of acoustic guitar, for example. The USB interface allows new sounds or programs to be downloaded from a computer. Keyboard 202 sends a keyboard event message to instrument processor 210 whenever a key is pressed or released. The message contains the key number, whether the key was pressed or released, and optionally the velocity of the key strike. Strummer 206a sends a string event message to processor 210 whenever there is a departure, indicating it was plucked, or when there is a pick arrival, silencing it. The message contains the string number, whether it is a pick arrival or departure, the technique (clean, heel mute, thumb harmonic), and the velocity. In one embodiment, strummer 206a also has one or more articulation devices such as tremolo bar 320, and will output an articulation event message to processor 210 periodically. The message contains a value and the articulation device number or type of articulation: for example pitch bend, tremolo, or pan. Processor 210 implements a guitar event handler to translate keyboard, strummer, and articulation messages into note on, note off, and continuous controller requests to an internal or external wavetable or MIDI synthesizer.

FIG. 7 is a flowchart for a guitar event handler implemented on processor 210 of the electronic keyboard strummer instrument of the present invention. The guitar event handler processes keyboard, strummer, and articulation event messages, and converts them to note on, note off, and continuous controller messages, to control a synthesizer. The use of note on, note off, and continuous controller message to play, stop, and modify notes in a MIDI or other synthesizer is well known to those skilled in the art.

When a keyboard event message arrives 702, update a list of currently held keys 704. If a key is released 706, output a note off message 708 to an internal or external synthesizer. Because of the dynamic note to string association, there is no fixed relationship between keys and strings for determining hammer-ons and pulloffs. If there is a held key a minor or major $2^{nd}$ below the released key, it is inferred to be a pull-off 709. In the case of a pull-off, issue a note off for the higher note, and play a pull-off instrument sample of the lower note 710. If a key is pressed 706, check for a hammer-on 712, and if found, issue a note on for the key, and a note off for the lower note 714. The check for a hammer-on is if there is a note sounding for a first key, and the user presses a key a minor or major $2^{nd}$ above the first key. If there is a string event strummer message 716, sort the held keys from lowest to highest, removing pull-off candidate notes, then assign the lowest to highest keys to the strings top to bottom 718. Other key to string assignment rules are possible. If the string event is an arrival, send a note off for the note associated with the string 726. If the string event is a departure 720, check to see if it is a retrigger 722 of a sustained note. If so, send a note off, then a note on for the note 724. If not, check to see if there aren't enough keys held to assign one to this string 728. If there aren't enough, issue a note on for a sample of the string muted by the left hand 730 (an important and often used guitar technique). An alternate implementation would be to only play the sound of strings plucked while muted by the left hand if there are no keys pressed, otherwise make no sound. If there are enough keys, issue a note on for the key associated with the string 732. Use the velocity from the string event strummer message to control the volume of the note. When a note on is issued (732 or 724), the technique specified in the string event strummer message is used to select the timbre or technique of the note sample. For example, if the strummer indicates a thumb harmonic technique was used to pick the string, the note on message will indicate that a sample recorded with that technique should be played, emulating a real guitar performance. Note samples recorded with the heel of the hand muting the note can be played back if the string event strummer message indicates that technique. String event strummer messages indicating other techniques, including new techniques that have no guitar equivalent, can be supported in the same manner. When an articulation event strummer message arrives 734, issue a continuous controller message 736 with the appropriate articulation and value.

Returning to FIG. 1, it can be seen that three octaves of a particular scale degree are in the same column, whereas they would be separated by fourteen white keys on a conventional piano. A roughly three octave range of notes can be played by the left hand, allowing common guitar chords to be played on the keyboard, while strumming with the right hand. The grouping by octaves is also valuable for teaching melodies and chords in terms of scale degrees. In one embodiment the root key 100 is always tuned to C, allowing the fingering to most closely match that of a conventional piano keyboard. In another embodiment, the root key 100 is tuned to the root of the musical key of the song to be played, allowing the scale degree of each note in the song to be determined most easily learning purposes, and resulting in the easiest fingering for songs in a major scale. Assuming root key 100 is tuned to the note F (87.3 Hz), key 118 would be tuned to F (174.6 Hz), and key 126 would be tuned to F (349.2 Hz). To play these notes in sequence on a guitar would require picking the top, third from the top, then the bottom string. To play these, or any three notes, in sequence on the present invention, the musician would pluck the top string three times, which is much easier for a novice musician. The present invention similarly makes it easier to play chords. A novice guitarist typically would play an F major chord on the bottom four strings, to avoid the stretch required to hold down the top string on the first fret. The open top string (note "E"), will sound dissonant, and should be avoided. It will be difficult for a novice guitarist to strum the bottom four strings of a guitar, while avoiding the top and second from the top string. To play any chord with four notes on the present invention, the musician strums the top four strings. If she inadvertently plucks one of the bottom two strings, it will not produce a dissonant note.

One embodiment is a system composed of a strummer, a separate keyboard controller with a piano keyboard, and a processor or other device that processes strummer and keyboard inputs, sounding the desired notes. Pairing the conventional keyboard with a strummer will allow keyboardists to create more realistic guitar performances than were previously possible, without having to learn the guitar fretboard.

Another embodiment is a keyboard strummer instrument where the keyboard is arranged to resemble a guitar fretboard. In this case, the assignment between notes and strings is from lowest to highest, top to bottom. This is different than the typical electronic guitar, which statically associates notes on the fretboard with a particular string, even though there may not be a physical string connecting fretboard and strummer. By using the note to string assignment of the present invention, the task of finding the right string that corresponds to a particular note is simplified. The top string, which is easiest to find by touch alone, will always produce one of the selected notes, rather than a potentially dissonant note. In another embodiment, the strummer has only one string, making it best suited to playing melodies or leads.

Other embodiments of the present invention may use a different rule to assign notes to strings. For example, to simulate a ukulele or banjo, the top string could be assigned to the highest note, and the remaining notes could be assigned lowest to highest from the $2^{nd}$ to the top string to the bottom string respectively. Another embodiment could assign notes to the bottom string first. In the case of melodies, where one note is played at a time, this would mean all notes would be played on the bottom string. The bottom string is easily accessed, because it is not blocked by strings below. Many melodic sequences (or leads) use the higher register of a guitar, so the choice of the bottom string would provide a familiar tactile feel to lead guitarists.

In another embodiment, a single key pressed indicates the root of a chord, and each string of the strummer is assigned a note and octave within the chord. For example, each string is mapped to its equivalent note in an open guitar chord. If the user pressed a G key (for example key 100 assuming the keyboard is tuned to the key of G), the strings (from top to bottom) would be assigned the notes: G (98.0 Hz), B (123.5 Hz), D (146.8 Hz), G (196.0 Hz), B (246.9 Hz), and G (392.0 Hz). Software on processor 210 is put in a one-finger chord mode by configuration block 222. Memory 212 stores a table of note-to-string assignments for the desired chords. When the user presses a key, processor 210 performs the note to string assignment, and waits to actuate the particular notes until one or more strings are plucked. Such a one-finger chord mechanism would help beginners quickly learn to play songs.

In another embodiment, the user may define open notes that are mapped to certain strings, without requiring the user to press any key. Similarly a drone note can be defined, that is actuated and terminated by some user action, but sounds continuously without requiring the user to hold down a key.

An additional embodiment would be to attach two handboards to a strummer, and have an instrument that could selectively be put into either a guitar mode, or a piano mode where the strummer events are ignored. Such an instrument would allow both piano and guitar to be played with ease and realism. In other embodiments, processor 210 may process the events differently to emulate other instruments, or other guitar techniques, such as finger tapping, or completely new electronic instruments.

Another embodiment of the present instrument invention is as a MIDI or digital controller without onboard sound generation capability. The embodiment would consist of a keyboard, strummer, and a processor. The outputs of this instrument would be events indicating timing, string actuation 716, note selection 702, timbre, and articulation 734 of notes. The output events may be transmitted or recorded via any wired or wireless technology. These events can be stored in computer memory to be replayed later by a software sequencer or sample player. The transmitted events may also be used to trigger sounds in real time, where a tablet computer, game console, cell phone, or other device would process the events, and perform the sample playback or sound synthesis functions. This embodiment could also be used as a gaming input device, where game action and a player's score depend on how accurately she reproduces the notes in a song. In one embodiment, the instrument is paired with a display device showing music notation, to create a music learning or gaming system, with real time feedback.

An advantage over prior art guitars is that the instrument of the present invention can be designed such that the handboard and strummer fold or disassemble when not in use, to make a compact, portable instrument. In addition, the instrument can be designed to be easily reconfigured as left handed, where the strummer is played by the left hand, and the keyboard is played by the right hand. In one embodiment, the distance and angle between the handboard and strummer are adjustable to suit the size and preferences of the user. In another embodiment, the back of the strummer and bottom of the keyboard form a hard outer shell or case when folded.

An alternate embodiment of the instrument uses the strummer events and note selection events to control the tones of a synthesizer, rather than selecting playback of prerecorded guitar tones. In this manner, completely new and expressive virtual instruments can be created.

It will be readily appreciated by those skilled in the art that various modifications of the present invention may be devised without departing from the essential concept of the invention, and all such modifications are intended to come within the scope of the present invention and the claims appended hereto. It is to be especially understood that the invention is not intended to be limited to illustrated embodiments, and that the substitution of a variant of a claimed element or feature, without any substantial resultant change in the working of the invention, will not constitute a departure from the scope of the invention. In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

I claim:

1. A musical instrument comprising:
a keyboard with a plurality of keys;
a strummer with one or more strings; and
a processor;
wherein the processor associates the sound of a muted string with a string on the strummer, if the string is plucked while none of the keys are depressed.

2. A musical instrument comprising:
a keyboard with a plurality of keys;
a strummer with one or more strings; and
a processor;
wherein the processor causes a note to sound with the hammer-on technique, in response to the following sequence of events:
(a) a first key on the keyboard is pressed, selecting a first note
(b) a string on the strummer is plucked, actuating the first note
(c) a second key on the keyboard is pressed, selecting a second note higher than and within a predefined range of the first note.

3. A musical instrument comprising:
a keyboard with a plurality of keys;
a strummer with one or more strings; and
a processor;
wherein the processor causes a note to sound with the pull-off technique, in response to the following sequence of events:
(a) a first key on the keyboard is pressed, selecting a first note
(b) a second key on the keyboard is pressed, selecting a second note lower than and within a predefined range of the first note
(c) a string on the strummer is plucked, actuating the first note
(d) the first key is released.

4. A musical instrument comprising:
a keyboard with a plurality of keys;
a strummer with one or more strings; and a processor;

wherein the strummer generates electrical signals indicating the picking technique used to actuate a note, selected from a group comprising clean and at least one of: muted and thumb harmonic, and the electrical signals indicating picking technique are used to select the timbre of the note.

5. A method of capturing music performance data, comprising:
- providing a first input means adapted to receive a first plurality of fingers of a user,
- generating electrical signals indicating the selection of particular musical notes, based on the locations of contact with the first input means by the first plurality of fingers,
- providing a second input means having one or more string locations, adapted to receive a second plurality of fingers or a pick,
- generating electrical signals indicating the actuation of any of the one or more string locations by the second plurality of fingers or the pick,
- making an association between a list of currently selected notes and one or more actuated string locations, and
- generating electrical signals indicating the pitch of one or more notes, according to the association,
- wherein the sound of a muted string is associated with a string location on the second input means, if the string location is plucked while none of the locations of contact on the first input means are associated with the string location.

6. A method of capturing music performance data, comprising:
- providing a first input means adapted to receive a first plurality of fingers of a user,
- generating electrical signals indicating the selection of particular musical notes, based on the locations of contact with the first input means by the first plurality of fingers,
- providing a second input means having one or more string locations, adapted to receive a second plurality of fingers or a pick,
- generating electrical signals indicating the actuation of any of the one or more string locations by the second plurality of fingers or the pick,
- making an association between a list of currently selected notes and one or more actuated string locations, and
- generating electrical signals indicating the pitch of one or more notes, according to the association,
- wherein a note is sounded with the hammer-on technique, in response to the following sequence of events:
  - (a) a first location on the first input means is pressed, selecting a first note
  - (b) a string location on the second input means is plucked, actuating the first note
  - (c) a second location on the first input means is pressed, selecting a second note higher than and within a predefined range of the first note.

7. A method of capturing music performance data, comprising:
- providing a first input means adapted to receive a first plurality of fingers of a user,
- generating electrical signals indicating the selection of particular musical notes, based on the locations of contact with the first input means by the first plurality of fingers,
- providing a second input means having one or more string locations, adapted to receive a second plurality of fingers or a pick,
- generating electrical signals indicating the actuation of any of the one or more string locations by the second plurality of fingers or the pick,
- making an association between a list of currently selected notes and one or more actuated string locations, and
- generating electrical signals indicating the pitch of one or more notes, according to the association,
- wherein a note is sounded with the pull-off technique, in response to the following sequence of events:
  - (a) a first location on the first input means is pressed, selecting a first note
  - (b) a second location on the first input means is pressed, selecting a second note lower than and within a predefined range of the first note
  - (c) a string location on the second input means is plucked, actuating the first note
  - (d) the first location on the first input means is released, while the second location on the first input means remains pressed.

8. A method of capturing music performance data, comprising:
- providing a first input means adapted to receive a first plurality of fingers of a user,
- generating electrical signals indicating the selection of particular musical notes, based on the locations of contact with the first input means by the first plurality of fingers,
- providing a second input means having one or more string locations, adapted to receive a second plurality of fingers or a pick,
- generating electrical signals indicating the actuation of any of the one or more string locations by the second plurality of fingers or the pick,
- making an association between a list of currently selected notes and one or more actuated string locations, and
- generating electrical signals indicating the pitch of one or more notes, according to the association,
- generating electrical signals indicating the technique used by a musician to actuate the string location, the techniques being selected from a group comprising clean and at least one of: muted and thumb harmonic.

* * * * *